(12) United States Patent
Weingartz et al.

(10) Patent No.: US 8,844,393 B2
(45) Date of Patent: Sep. 30, 2014

(54) FORK POSITION AND SYNCHRONIZATION CONTROL IN A DUAL CLUTCH TRANSMISSION USING PRESSURE CONTROL SOLENOIDS

(75) Inventors: Christopher Jay Weingartz, Holly, MI (US); Andreas Gustavsson, Lidkoping (SE); Tomas Carlsson, Amal (SE); Ludvig Franzen, Trollhattan (SE); Mikael M. Johansson, Gothenburg (SE)

(73) Assignee: GM Global Technology Operations LLC

( * ) Notice: Subject to any disclaimer, the term of this patent is extended or adjusted under 35 U.S.C. 154(b) by 525 days.

(21) Appl. No.: 12/850,159

(22) Filed: Aug. 4, 2010

(65) Prior Publication Data
US 2011/0252910 A1     Oct. 20, 2011

Related U.S. Application Data

(60) Provisional application No. 61/324,568, filed on Apr. 15, 2010.

(51) Int. Cl.
| F16H 59/00 | (2006.01) |
| F16H 61/00 | (2006.01) |
| F16H 61/04 | (2006.01) |
| F16H 61/10 | (2006.01) |
| F16H 61/28 | (2006.01) |
| F16H 59/46 | (2006.01) |
| F16H 61/688 | (2006.01) |

(52) U.S. Cl.
CPC .......... *F16H 61/28* (2013.01); *F16H 2059/465* (2013.01); *F16H 2061/2823* (2013.01); *F16H 61/688* (2013.01)

USPC ........................................................... 74/335

(58) Field of Classification Search
USPC ..................... 74/335, 473.11, 473.36, 473.37
See application file for complete search history.

(56) References Cited

U.S. PATENT DOCUMENTS

| 5,046,174 A | 9/1991 | Lentz et al. |
| 5,072,390 A | 12/1991 | Lentz et al. |
| 5,417,402 A | 5/1995 | Speybroeck |
| 5,683,329 A | 11/1997 | Kono et al. |
| 5,890,392 A | 4/1999 | Ludanek et al. |
| 5,993,350 A | 11/1999 | Lawrie et al. |
| 6,070,117 A | 5/2000 | Yamada et al. |
| 6,164,149 A | 12/2000 | Ohmori et al. |
| 6,253,140 B1 | 6/2001 | Jain et al. |
| 6,276,224 B1 * | 8/2001 | Ueda et al. .......... 74/335 |
| 6,568,515 B2 | 5/2003 | Harries |

(Continued)

FOREIGN PATENT DOCUMENTS

CN         101603588 A      12/2009

OTHER PUBLICATIONS

U.S. Appl. No. 12/850,083, filed Aug. 4, 2010, Weingartz et al.
U.S. Appl. No. 12/850,096, filed Aug. 4, 2010, Weingartz et al.

*Primary Examiner* — Troy Chambers
*Assistant Examiner* — Emily Cheng

(57) ABSTRACT

A dual clutch transmission (DCT) control module includes a position control module that actuates a shift fork of the DCT during a first shift state based on a measured shift fork position and a target shift fork position. A force control module adjusts a control force associated with the shift fork during a second shift state based on synchronizer slip.

11 Claims, 6 Drawing Sheets

(56) References Cited

U.S. PATENT DOCUMENTS

| | | | |
|---|---|---|---|
| 6,619,152 B2 * | 9/2003 | Ochi et al. | 74/335 |
| 6,694,834 B2 * | 2/2004 | Bansbach et al. | 74/335 |
| 6,997,849 B2 | 2/2006 | Stasik et al. | |
| 7,228,216 B2 * | 6/2007 | Inoue | 701/67 |
| 7,682,285 B2 | 3/2010 | Kraska et al. | |
| 7,706,949 B2 | 4/2010 | Sah et al. | |
| 7,757,577 B2 | 7/2010 | Kawamoto et al. | |
| 8,079,936 B2 | 12/2011 | MacFarlane et al. | |
| 2002/0014130 A1 | 2/2002 | Ogami et al. | |
| 2004/0121873 A1 | 6/2004 | Bansbach et al. | |
| 2005/0107214 A1 | 5/2005 | Koenig | |
| 2005/0132832 A1 * | 6/2005 | Yasui et al. | 74/335 |
| 2008/0161159 A1 | 7/2008 | Runde et al. | |
| 2008/0202853 A1 | 8/2008 | Ogami | |
| 2008/0210032 A1 | 9/2008 | Uberti et al. | |
| 2008/0234105 A1 * | 9/2008 | Sakamoto et al. | 477/124 |
| 2009/0118082 A1 | 5/2009 | Heap et al. | |
| 2009/0165584 A1 | 7/2009 | Ishii | |
| 2009/0211862 A1 | 8/2009 | Moorman et al. | |
| 2009/0247358 A1 | 10/2009 | Kojima et al. | |
| 2011/0168510 A1 | 7/2011 | Lundberg et al. | |

\* cited by examiner

FORK POSITION AND SYNCHRONIZATION CONTROL IN A DUAL CLUTCH TRANSMISSION USING PRESSURE CONTROL SOLENOIDS

CROSS-REFERENCE TO RELATED APPLICATIONS

This application claims the benefit of U.S. Provisional Application No. 61/324,586, filed on Apr. 15, 2010. The disclosure of the above application is incorporated herein by reference in its entirety.

This application is related to U.S. patent application Ser. No. 12/850,083 filed on Aug. 4, 2010, and Ser. No. 12/850,096 filed on Aug. 4, 2010. The disclosures of the above applications are incorporated herein by reference in their entirety.

FIELD

The present disclosure relates to dual clutch transmission control systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A manual transmission drivetrain includes an internal combustion engine (ICE), a clutch and a manual transmission. The clutch engages with a flywheel on the ICE and transfers torque output of the engine to the manual transmission. Torque transfer from the ICE to the transmission is interrupted when a vehicle operator manually shifts between gears of the transmission. During a gear shift event, the clutch is disengaged (i.e. the ICE is disengaged from the transmission), a desired gear is manually selected, and the clutch is reengaged. Disengagement of the ICE from the transmission can negatively affect fuel economy and vehicle acceleration.

An automatic transmission drivetrain may include an internal combustion engine (ICE), a torque converter and an automatic transmission with planetary gear sets. The ICE provides output torque to the torque converter. The torque converter transfers torque from the ICE to the automatic transmission based on engine speed. The planetary gear sets include sun, carrier and ring gears that each has input, output and stationary operating states. Different gear ratios are selected by adjusting the operating state of each of the planetary gears in the planetary gear sets. An automatic transmission drivetrain provides uninterrupted torque transfer from the ICE to an output shaft of the automatic transmission. Typically, complex logic based approaches are used to control operating states of the planetary gears.

A dual-clutch transmission (DCT) drivetrain includes an ICE and a DCT (or semi-automatic transmission). The DCT includes two clutches, inner and outer transmission shafts, and two gear sets with respective gear shafts and/or lay shafts. As an example, the inner transmission shaft may be associated with a first gear set and controlled using a first clutch. The outer transmission shaft may be associated with a second gear set and controlled using a second clutch. The first gear set may include first, third and fifth gears. The second gear set may include second, fourth and sixth gears. By using two transmission shafts, a DCT drivetrain can provide uninterrupted torque transfer between the ICE and an output shaft of the DCT during gear shifts. This decreases shift times and improves fuel economy.

SUMMARY

A dual clutch transmission (DCT) control module includes a position control module that actuates a shift fork of the DCT during a first shift state based on a measured shift fork position and a target shift fork position. A force control module adjusts a control force associated with the shift fork during a second shift state based on synchronizer slip.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a schematic diagram of a DCT in;

DETAILED DESCRIPTION

Figure 1:
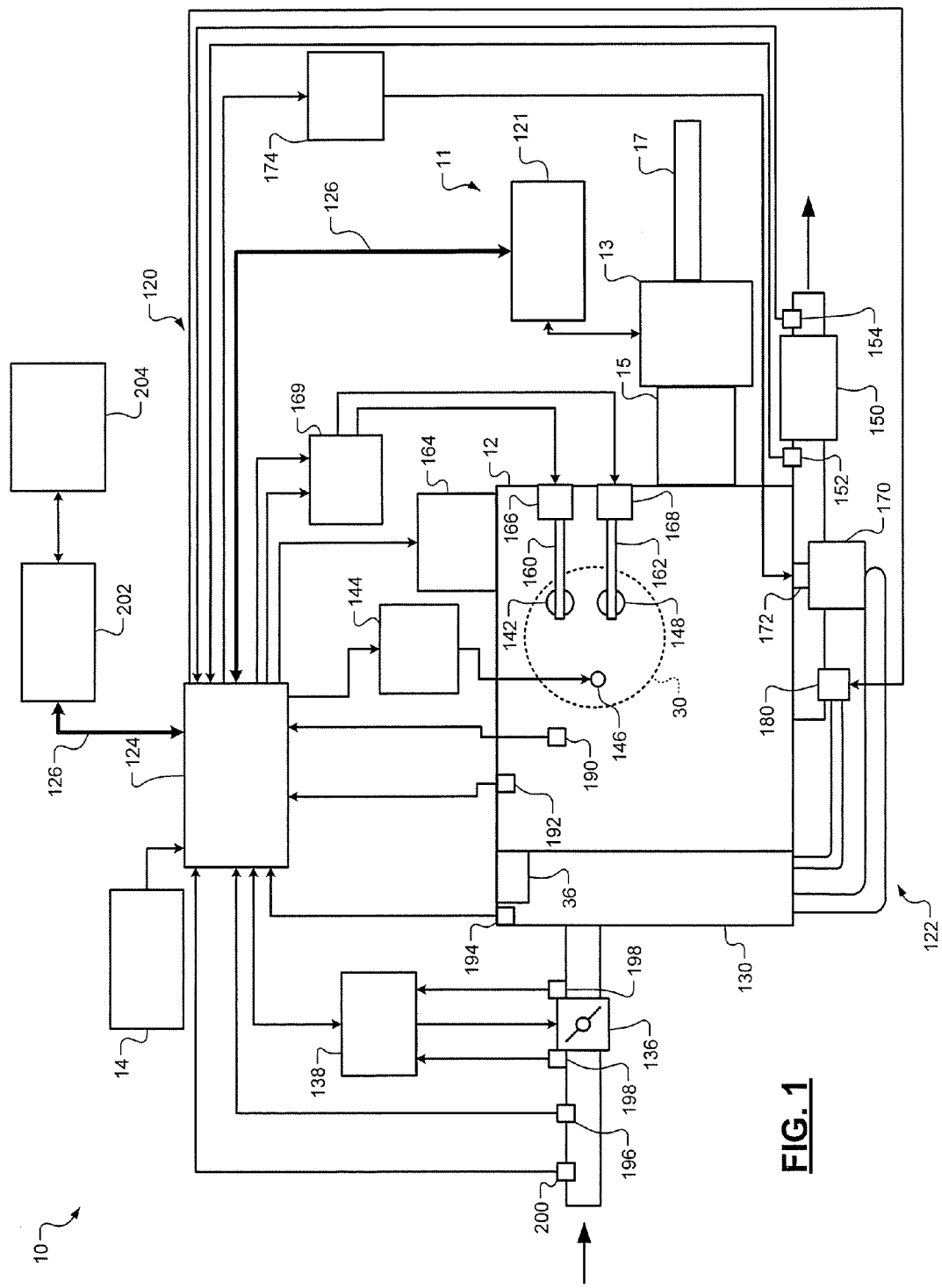
FIG. 1 is a functional block diagram of an exemplary dual clutch transmission (DCT) drivetrain system and corresponding DCT control system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
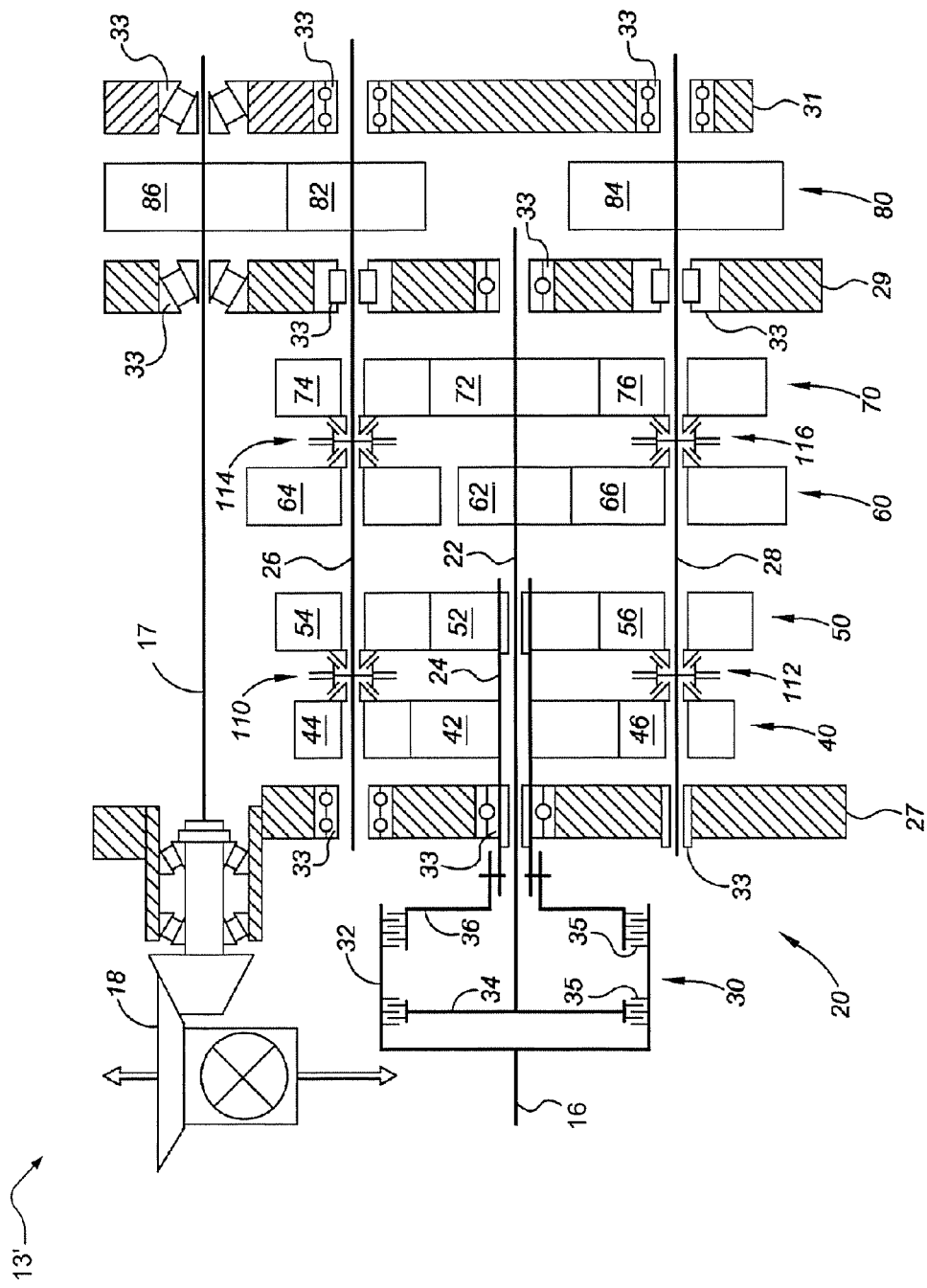

In FIG. 1, an exemplary dual clutch transmission (DCT) drivetrain (shift sequencing) system 10 and corresponding DCT control system 11 are shown. The DCT drivetrain system 10 includes an internal combustion engine (ICE) 12 and a DCT 13 (example of a DCT is shown in FIG. 2). The ICE 12 combusts an air/fuel mixture to produce drive torque for a vehicle based on information from a driver input module 14 (e.g., driver input signal DI) and other information described below. While a spark ignition type engine is described herein, the present disclosure is applicable to other types of torque producers, such as gasoline type engines, gaseous fuel type engines, diesel type engines, propane type engines, and hybrid type engines. The DCT control system 11 selects transmission gears and performs gear sequencing based on torque output of the engine, the driver input signal DI and other information described below.

The DCT 13 may be a dry or wet DCT. A wet DCT refers to a DCT that includes wet clutches and bathes components in lubricating fluid to reduce friction and heat. A dry DCT does not include a fluid bath, but has decreased drag or spin loss and improved fuel economy over a wet DCT. Wet DCTs are often used for higher torque applications than dry DCTs. The DCT 13 may be directly connected to the ICE 12 or may be connected to the ICE 12 via a torque converter and/or a dual mass flywheel 15, as shown. A dual mass flywheel may be used to: reduce torsional vibration induced by engine firing pulses; eliminate excessive transmission gear rattle; reduce gear change/shift effort; and improve fuel economy.

In FIG. 2, a DCT 13' is shown that have multiple selectable gear ratios. In the example shown, the DCT 13' has 7 forward gear ratios and 1 reverse gear ratio. The DCT 13' includes an input shaft 16 and output shaft 17. The input shaft 16 receives torque from, for example, the ICE 12 and/or the dual mass flywheel 15. The output shaft 17 is connected to a final drive unit 18.

The DCT 13' further includes a countershaft gearing arrangement 20 with a first interconnecting shaft 22 and a second interconnecting shaft 24, which is a sleeve shaft concentric with the first interconnecting shaft 22. The countershaft gearing arrangement 20 further includes a first countershaft (lay shaft) 26 and a second countershaft 28. The countershafts 26, 28 may be spaced apart from and parallel with the input shaft 16, the output shaft 17 and the interconnecting shafts 22, 24.

The output shaft 17, the interconnecting shafts 22, 24 and the countershafts 26, 28 are supported by support members including a first housing member 27, a second housing member 29, and a third housing member 31. The housing members 27, 29, 31 are fitted with bearings 33 for rotatably supporting the output shaft 17, the first and second interconnecting shafts 22, 24, and the countershafts 26, 28.

A dual clutch 30 is connected between input shaft 16 and the first and second interconnecting shafts 22, 24. The dual clutch 30 includes a clutch housing 32 connected for rotation with input shaft 16. Further, the dual clutch 30 has first and second clutch elements or hubs 34 and 36. The clutch elements 34 and 36 and the housing 32 provide a dual friction clutch assembly. The clutch elements 34, 36 and the clutch housing 32 have friction plates 35 mounted thereon that interact to provide two friction clutches.

The clutch element 34 is connected for rotation with the first interconnecting shaft 22. The clutch element 36 is connected for rotation with the second interconnecting shaft 24. Thus, selective engagement of the clutch element 34 with the clutch housing 32 connects the input shaft 12 for rotation with first interconnecting shaft 22. Selective engagement of the clutch element 36 with the clutch housing 32 connects the input shaft 12 for rotation with second interconnecting shaft 24.

The countershaft gearing arrangement 20 also includes co-planar and intermeshing gear sets 40, 50, 60, 70, and 80.

The gear set 40 includes gear 42, gear 44, and gear 46. Gear 42 is connected for rotation with the second interconnecting shaft 24 and intermeshes with gear 44 and gear 46. Gear 44 is selectively connectable for rotation with the first countershaft 26. Gear 46 is selectively connectable for rotation with the second countershaft 28.

Co-planar gear set 50 includes gear 52, gear 54, and gear 56. Gear 52 is connected for rotation with the second interconnecting shaft 24 and intermeshes with gear 54 and gear 56. Gear 54 is selectively connectable for rotation with the first countershaft 26. Gear 56 is selectively connectable for rotation with the second countershaft 28.

Co-planar gear set 60 includes gear 62, gear 64, and gear 66. Gear 62 is connected for rotation with the first interconnecting shaft 22 and intermeshes with gear 66. Gear 66 is selectively connectable for rotation with the second countershaft 28. Gear 64 is selectively connectable for rotation with the first countershaft 26 and is also intermeshed with gear 66.

Co-planar gear set 70 includes gear 72, gear 74, and gear 76. Gear 72 is connected for rotation with the first interconnecting shaft 22 and intermeshes with gear 74 and gear 76. Gear 74 is selectively connectable with the first countershaft 26. Gear 76 is selectively connectable with the second countershaft 28. Co-planar or transfer gear set 80 includes gear 82, gear 84, and gear 86. Gear 82 is connected for rotation with the first countershaft 26 and intermeshes with gear 86. Gear 86 is connected for rotation with the output shaft 17. Gear 84 is selectively connectable for rotation with the second countershaft 28 and is also intermeshed with gear 86.

The DCT 13' further includes synchronizers 110, 112, 114, and 116. Each of the synchronizers 110, 112, 114, and 116 may include a shift fork (not shown) that is bi-directionally translated by an actuator or piston (not shown) into at least two engaged positions and a neutral or disengaged position.

For example, synchronizer 110 is selectively engageable with gear 44 or gear 54. Once engaged, the synchronizer 110 connects gear 44 or gear 54 to the first countershaft 26 for rotation therewith. Synchronizer 112 is selectively engageable with gear 46 or gear 56. Once engaged, the synchronizer 112 connects gear 46 or gear 56 to the second countershaft 28 for rotation therewith. Synchronizer 114 is selectively engageable with gear 64 or gear 74. Once engaged, the synchronizer 114 connects gear 64 or gear 74 to the first countershaft 26 for rotation therewith. Synchronizer 116 is selectively engageable with gear 66 or gear 76. Once engaged, the synchronizer 116 connects gear 66 or gear 76 to the second countershaft 28 for rotation therewith.

The DCT 13' is capable of transmitting torque from the input shaft 16 to the output shaft 17 based on the selected gear ratio. Each forward torque ratio and reverse torque ratio is attained by engagement of the clutches 35 in the dual clutch 30 and one or more of the synchronizers 110, 112, 114, and 116.

As an example, to establish a first forward torque ratio (i.e. a 1st gear), clutch element 36 of the dual clutch 30 is engaged and synchronizer 110 is engaged to connect gear 54 to the first countershaft 26. By this engagement, clutch element 36 of the dual clutch 30 transfers torque from the input shaft 16 through clutch housing 32 to the second interconnecting shaft 24. Further, torque is transferred from the second interconnecting shaft 24 through gear 52 to gear 54. Upon engagement of synchronizer 110, gear 54 transfers torque to the first countershaft 26. The first countershaft 26 transfers the torque to gear 82. Gear 82 transfers the torque to gear 86, which in turn transfers the torque to the output shaft 17. The output shaft 17 transfers the torque to the final drive unit 18. Other gear ratios may be selected by engagement of respective gears and shafts.

Referring again to FIG. 1, the DCT drivetrain system 10 includes the DCT control system 11 and may include an engine control system 120. The DCT control system 11 includes the DCT 13 and a DCT control module 121. The engine control system 120 includes the engine 12, an exhaust system 122 and an engine control module (ECM) 124. The DCT control module 121 and the ECM 124 may communicate with each other via serial and/or parallel connections and/or via a car area network (CAN) 126.

In operation, air is drawn into an intake manifold 130 of the engine 12 through a throttle valve 136. The ECM 124 commands a throttle actuator module 138 to regulate opening of the throttle valve 136 to control the amount of air drawn into the intake manifold 130 based on, for example, information from the driver input module 14. The driver input module 14 may be or receive signals from, for example, an accelerator pedal. Air from the intake manifold 130 is drawn into cylinders of the engine 12 through an intake valve 142. While the engine 12 may include multiple cylinders, for illustration purposes, a single representative cylinder 30 is shown.

The ECM 124 controls the amount of fuel injected into the intake manifold 130 and/or the cylinder 30. The injected fuel mixes with the air and creates the air/fuel mixture in the cylinder 30. A piston (not shown) within the cylinder 30 compresses the air/fuel mixture. Based upon a signal from the ECM 124, a spark actuator module 144 of an ignition system energizes a spark plug 146 in the cylinder 30, which ignites the air/fuel mixture.

The combustion of the air/fuel mixture drives the piston down, thereby driving a rotating crankshaft (not shown). The piston then begins moving up again and expels the byproducts of combustion through an exhaust valve 148. The byproducts of combustion are exhausted from the vehicle via the exhaust system 14.

The exhaust system 14 may include a catalytic converter 150, a pre-converter (primary) $O_2$ sensor 152, and a post-converter (secondary) $O_2$ sensor 154. The sensors 152, 154 communicate with the ECM 124. The catalytic converter 150 is used to control emission output. The intake and exhaust valves 142, 148 may be controlled by a cylinder actuator module 164 via respective camshafts 160, 162 and cam phasers 166, 168. The cam phasers 166, 168 are controlled via a phaser actuator module 169.

The engine control system 120 may include a boost device that provides pressurized air to the intake manifold 130. For example, FIG. 1 depicts a turbocharger 170. The turbocharger 170 provides a compressed air charge to the intake manifold 130. A wastegate 172 may allow exhaust gas to bypass the turbocharger 170, thereby reducing the turbocharger's output (or boost). The ECM 120 controls the turbocharger 170 via a boost actuator module 174. The boost actuator module 174 may modulate the boost of the turbocharger 170 by controlling the position of the wastegate 172. Alternate engine systems may include a supercharger that provides compressed air to the intake manifold 130 and is driven by the crankshaft. The engine control system 120 may further include an exhaust gas recirculation (EGR) valve 180, which selectively redirects exhaust gas back to the intake manifold 130.

The DCT control system 11 and/or the engine control system 120 may measure the speed of the crankshaft (engine speed) in revolutions per minute (RPM) using an RPM sensor 190. Temperature of the engine 12 may be measured using an engine coolant or oil temperature (ECT) sensor 192. The ECT sensor 192 may be located within the engine 12 or at other locations where the coolant and/or oil is circulated, such as a radiator (not shown).

The pressure within the intake manifold 130 may be measured using a manifold absolute pressure (MAP) sensor 194. In various implementations, engine vacuum may be measured, where engine vacuum is the difference between ambient air pressure and the pressure within the intake manifold 130. The mass of air flowing into the intake manifold 130 may be measured using a mass air flow (MAF) sensor 196. The ECM 124 determines cylinder fresh air charge primarily from the MAF sensor 196 and calculates a desired fuel mass using open loop, closed loop and transient fueling algorithms. Fuel injector characterization functions convert the desired fuel mass into an injector on time, which is executed by fuel injector outputs of the ECM 124.

The throttle actuator module 138 may monitor the position of the throttle valve 136 using one or more throttle position sensors (TPS) 198. The ambient temperature of air being drawn into the engine control system may be measured using an intake air temperature (IAT) sensor 200. The ECM 124 may use signals from the sensors disclosed herein to make control decisions for the engine control system.

The ECM 124 may communicate with DCT control module 121 to coordinate shifting gears in the DCT 13. For example, the ECM 124 may reduce torque during a gear shift. The ECM 124 may communicate with a hybrid control module 202 to coordinate operation of the engine 12 and an electric motor 204. In one embodiment, the hybrid control module 202 and the electric motor 204 are not included in the DCT drivetrain system 10. In various implementations, the DCT control module 121, the ECM 124, and the hybrid control module 202 may be integrated into one or more modules.

Figure 3:
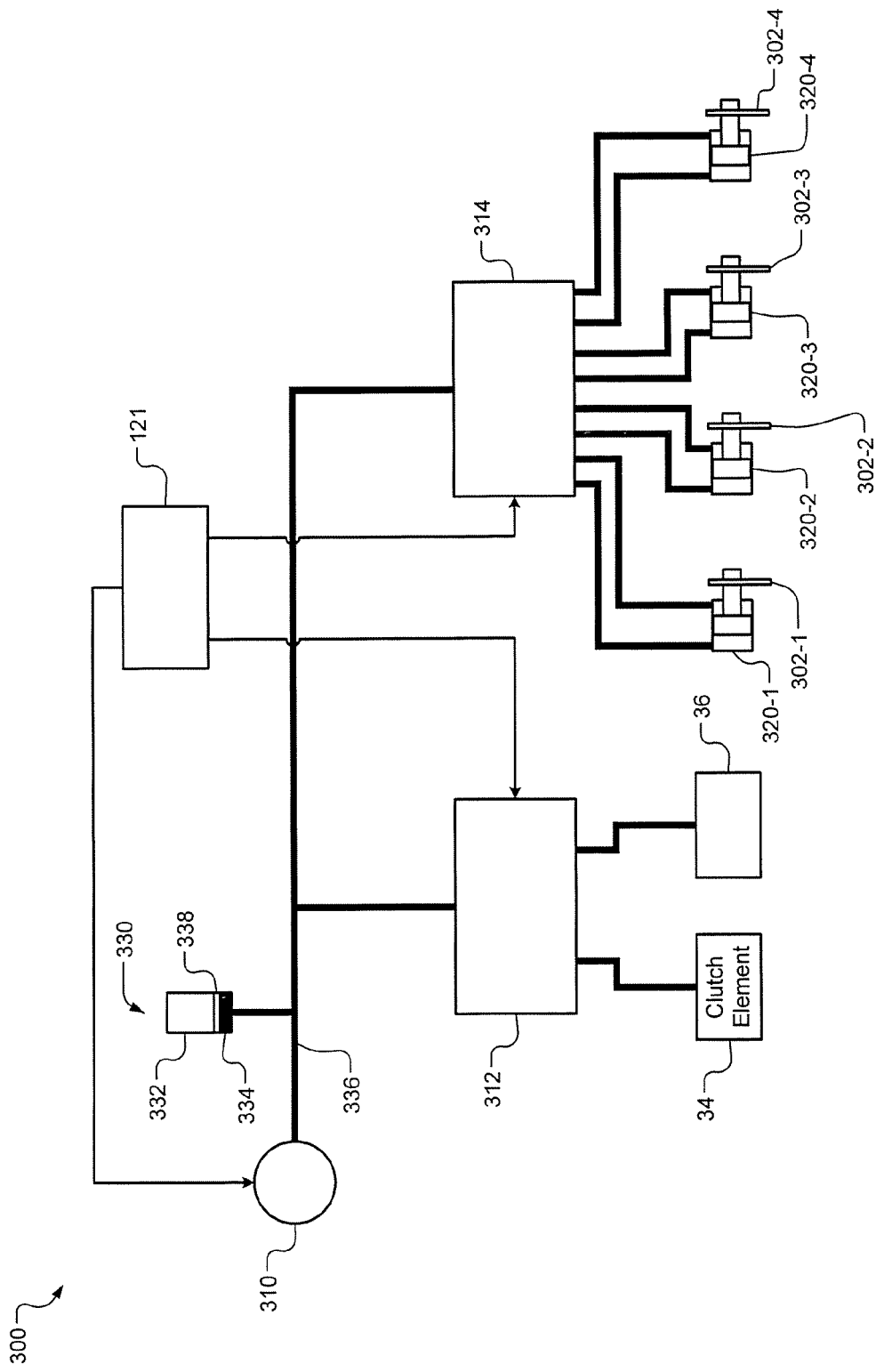
FIG. 3 is a functional block diagram of a DCT oil flow control system according to the present disclosure.

Referring now to FIG. 3, a DCT oil flow control system 300 communicates with shift forks 302-1, 302-2, 302-3, and 302-4, referred to collectively as shift forks 302, which correspond to the synchronizers 110, 112, 114, 116 (as shown in FIG. 2), and first and second clutch elements (e.g. first and second clutch elements 34, 36).

An electric pump 310 is in fluid communication with clutch control solenoids 312 and shift rail control solenoids and valves 314. The DCT control module 121 controls operation of the clutch control solenoids 312 and the shift rail control solenoids and valves 314. The pump 310 applies fluid pressure to actuate the first and second clutch elements 34, 36 via clutch control solenoids 312. Conversely, the pump 310 applies fluid pressure to actuate pistons 320-1, 320-2, 320-3, and 320-4, referred to collectively as pistons 320, via the shift rail control solenoids and valves 314. The pistons 320 actuate respective ones of the shift forks 302.

The DCT oil flow system control 300 includes an accumulator 330. For example only, the accumulator 330 may be a nitrogen charged accumulator. The accumulator 330 includes a first chamber 332 that contains a pressurized gas such as nitrogen and a second chamber 334 that contains hydraulic fluid (e.g. transmission oil) and is in fluid communication with hydraulic (e.g. oil) line 336. The accumulator 330 includes a floating piston 338. The accumulator 330 stores the oil in the second chamber 334 under pressure exerted by the gas in the first chamber 332 on the floating piston 338.

Figure 4:
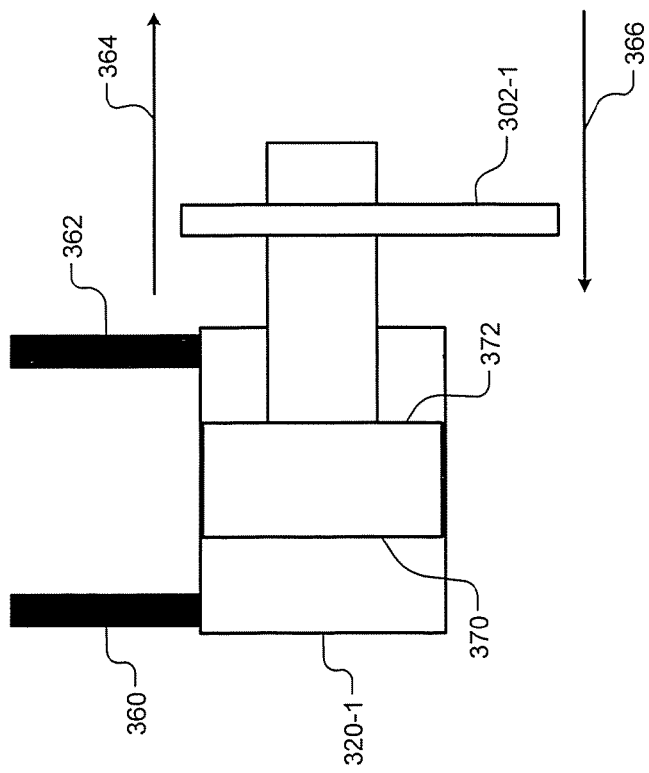
FIG. 4 illustrates a DCT piston and shift fork according to the present disclosure.

Referring now to FIG. 4, operation of the pistons 320 and shift forks 302 are shown in more detail. For illustrative purposes, only the piston 320-1 and the shift fork 302-1 are shown, but those skilled in the art can appreciate that the pistons 320-2, 320-3, and 320-4 and respective shift forks 302-2, 302-3, and 302-4 operate in a similar manner.

The piston 320-1 is in fluid communication with hydraulic lines 360 and 362. Hydraulic fluid (i.e. oil) in the hydraulic lines 360 and 362 exerts pressure on the piston 320-1 to laterally actuate the shift fork 302-1 in either a first direction 364 or a second direction 366. For example, to actuate the shift fork 302-1 in the first direction 364, hydraulic pressure is applied to a first side 370 of the piston 320-1 via the hydraulic line 360. Conversely, to actuate the shift fork 302-1 in the second direction 366, hydraulic pressure is applied to a second side 372 of the piston via the hydraulic line 362. The DCT control module 121 selectively activates various ones of the shift rail control solenoids and valves 314 to apply desired pressure to the first and second sides 370, 372 of the piston 320-1.

Figure 5:
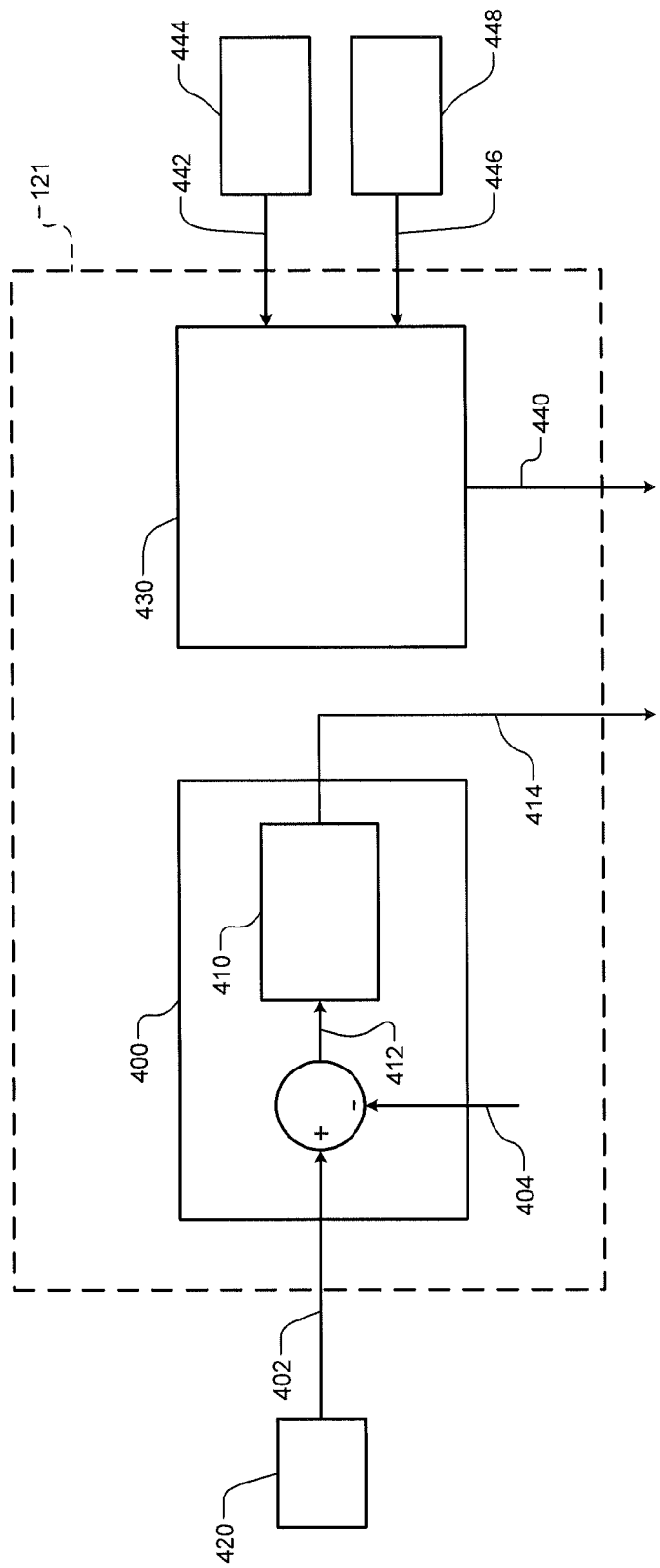
FIG. 5 is a functional block diagram of a DCT control module according to the present disclosure.

Referring now to FIG. 5, the DCT control module 121 is shown in more detail. The DCT control module 121 controls the pistons 320 and the shift forks 302 to control engagement and disengagement of the synchronizers 110, 112, 114, 116. Engagement of the synchronizers 110, 112, 114, 116 includes start, synchronizing, and synchronized shift states. The DCT control module 121 controls the pistons 320 during disengagement and during the start and synchronized shift states using position control. During position control, the DCT control module 121 controls a force on each side of one of the pistons 320 to move a corresponding one of the shift forks 302 to a target position. Conversely, the DCT control module 121 controls the pistons 320 during the synchronizing shift state using force control. During force control, the DCT control module 121 controls the force on each side of one of the pistons 320 to synchronize a speed of a shaft with a corresponding gear. Exemplary position and force control methods are disclosed in copending U.S. patent application Ser. No. 12/850,083, filed on Apr. 15, 2010 and Ser. No. 12/850,096, filed on Apr. 15, 2010, which are incorporated herein by reference.

For example, the DCT control module 121 may include a position control module 400. The position control module 400 receives a target fork position 402 and a measured fork position 404 and controls a position of one of the shift forks 302 accordingly. The DCT control module 121 receives the measured fork position 404 from a fork position sensor 420. For example, the position control module 400 may include a proportional-integral-derivative (PID) controller 410. The PID controller 410 receives an error signal 412 based on the target fork position 402 and the measured fork position 404 and generates an output force 414 based on the error signal 412. The DCT control module 121 controls shift fork position using the output force 414 to achieve the target fork position 402. The position control module 400 may use different PID calibrations for each shift state and gear.

During the start shift state, the DCT control module 121 uses the position control module 400 to control the position of one or more of the shift forks 302 (e.g. the shift fork 302-1). For example, when a corresponding synchronizer and gear are disengaged, the piston 320-1 is in a first position (e.g. a centered or neutral position). When the corresponding synchronizer and gear are to be engaged (e.g. in response to a shift command), the DCT control module 121 uses position control to move the shift fork 302-1 to a second position. For example, when the shift fork 302-1 is in the second position, the synchronizer is in a synchronizing position. The start shift state ends when the shift fork 302-1 is in the second position.

Figure 6:
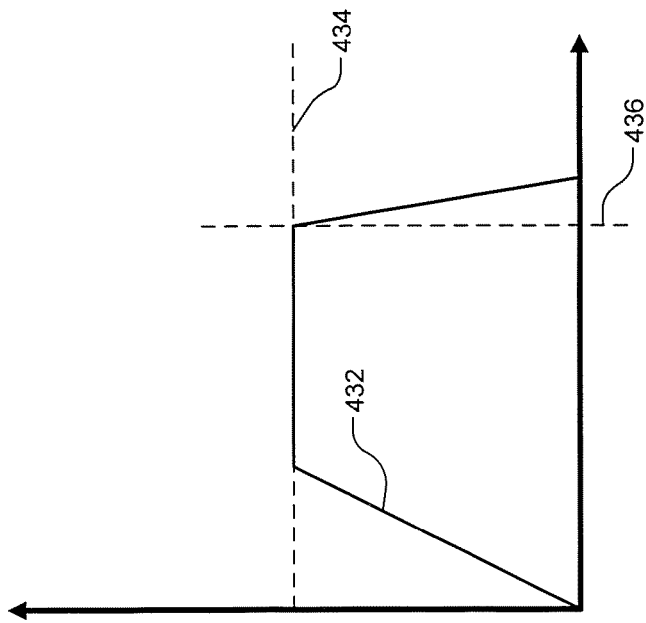
FIG. 6 is a graph of control force vs. time during force control according to the present disclosure.

When the start shift state ends the DCT control module 121 uses force control during the synchronization shift state. For example, the DCT control module 121 includes a force control module 430. As shown in FIG. 6, the force control module 430 increases a control force 432 on the first side 370 of the piston 320-1 until the control force 432 reaches a requested force threshold 434. For example, the force control module 430 ramps up the control force 432 at a calibrated rate. The force control module 430 may maintain a calibrated load force on the second side 372 of the piston 320-1 (i.e. an opposite side of the control force 432). The force control module 430 maintains the control force 432 at the requested force threshold 434 until a synchronizer slip reaches a predetermined threshold at a time 436. For example, when the synchronizer slip reaches the predetermined threshold, a gear corresponding to the shift fork 302-1 is synchronized with a corresponding transmission shaft. At the time 436, the force control module 430 ramps down the control force 432 to end the synchronization shift state. The shift fork 302-1 is not moved during the synchronization shift state.

Referring again to FIG. 5, during the synchronization shift state the force control module 430 generates a control force signal 440 based on synchronizer slip, rotational inertia, and synchronizer capacity. For example, the force control module 430 may receive an input shaft speed 442 from an input shaft speed sensor 444 and an output shaft speed 446 from an output shaft speed sensor 448. The force control module 430 calculates the synchronizer slip based on the input shaft speed 442, the output shaft speed 446, and a known gear ratio.

When the synchronization shift state ends (i.e. synchronizer slip reaches the predetermined threshold and the control force 432 is ramped down), the DCT control module 121 returns to position control in the synchronized state. In the synchronized state the DCT control module 121 moves the shift fork 302-1 to a third position. For example, in the third position the shift fork 302-1 is in a fully engaged position. The position control module 400 moves the shift fork 302-1 to the third position using PID control.

When the DCT control module 121 receives a shift command that requires disengagement, the DCT control module 121 continues position control in the disengagement state. In the disengagement state the DCT control module 121 moves the shift fork 302-1 back to a center or neutral position (e.g. the first position). Alternatively, if the piston 320-1 is a three area piston, the DCT control module 121 may apply high pressure to both sides of the piston 320-1 to center the piston 320-1.

Figure 7:
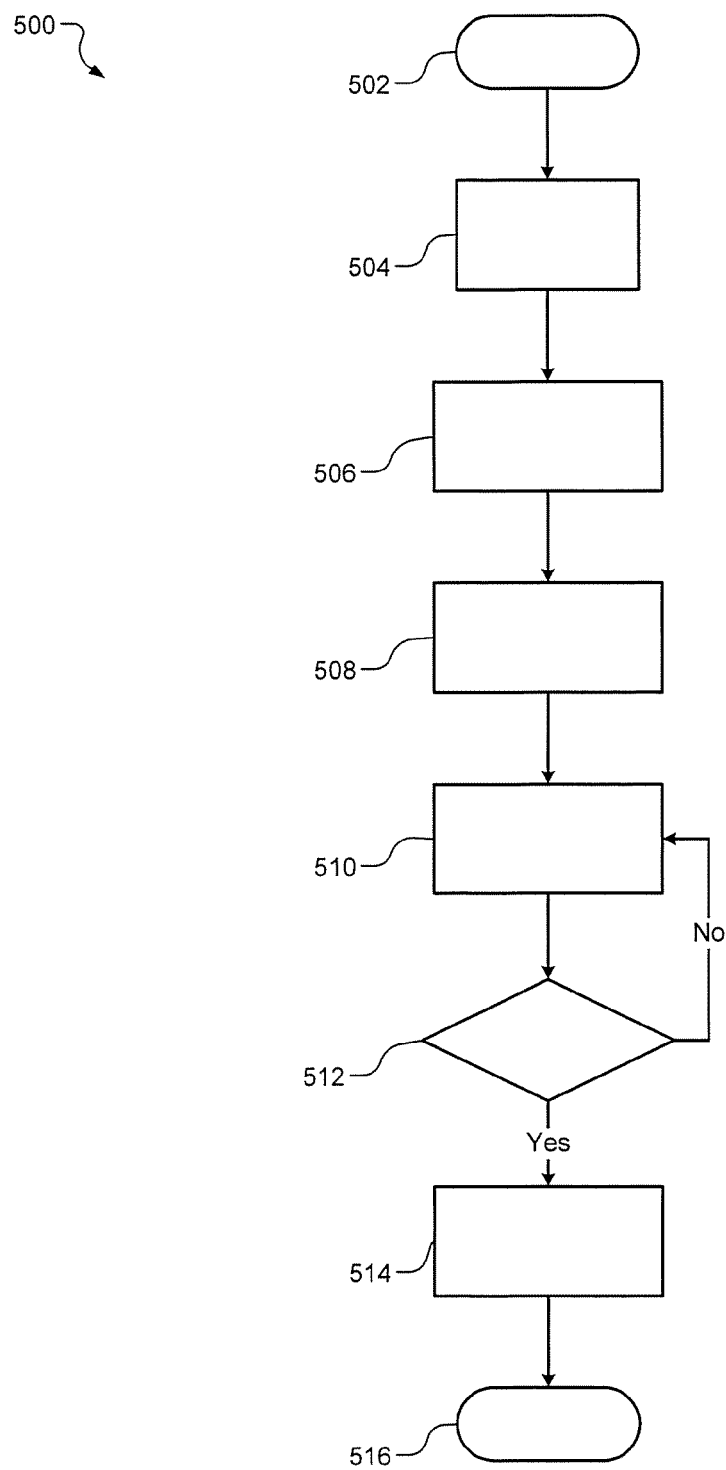
FIG. 7 illustrates steps of a DCT fork position and synchronization control method according to the present disclosure.

Referring now to FIG. 7, a fork position and synchronization control method 500 begins in step 502. In step 504 the method 500 receives a shift command that requires a disengaged gear to be engaged. In step 506 the method 500 uses position control in the start shift state to center a piston corresponding to the disengaged gear. In step 508 the method 500 uses force control in the synchronizing shift state to apply a control force until a predetermined threshold (i.e. a target synchronizer slip) is reached. In step 510 the method 500 returns to position control in the synchronized shift state to move a shift fork to a fully engaged position. In step 512 the method 500 determines whether a shift command requires disengagement of the gear. If true, the method 500 continues to step 514. If false, the method 500 continues to maintain the shift fork in the fully engaged position in step 510. In step 514 the method 500 uses position control to center the piston and disengage the gear. The method 500 ends in step 516.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A dual clutch transmission (DCT) control module, comprising:

a position control module that, using position-based control, controls a force applied to a piston to actuate a corresponding shift fork of a DCT; and a force control module that, using force-based control, increases a control force applied to the piston to control the shift fork;

wherein the position control module, using the position-based control, controls a force applied to the piston to actuate the shift fork during a first shift state based on a measured shift fork position and a first target shift fork position;

wherein the force control module, using the forced-based control and in response to the first shift state ending and the shift fork reaching the first target shift fork position, increases the control force applied to the piston to control the shift fork during a second shift state based on a requested force and synchronizer slip; and wherein the position control module, in response to the second shift state ending, resumes using the position-based control to control a force applied to the piston to actuate the shift fork to a second target shift fork position.

2. The DCT control module of claim 1 wherein the position control module includes a proportional-integral-derivative (PID) controller.

3. The DCT control module of claim 1 wherein the first shift state is a start shift state.

4. The DCT control module of claim 1 wherein the position control module actuates the shift fork of the DCT during a third shift state after the second shift state.

5. The DCT control module of claim 4 wherein the third shift state is a synchronized shift state.

6. The DCT control module of claim 4 wherein the position control module actuates the shift fork of the DCT during a fourth shift state after the third shift state.

7. The DCT control module of claim 6 wherein the fourth state is a disengagement shift state.

8. The DCT control module of claim 1 wherein the force control module increases the control force until the control force reaches the requested force during the second shift state.

9. The DCT control module of claim 8 wherein the force control module maintains the control force at the requested force until the synchronizer slip reaches a predetermined threshold.

10. The DCT control module of claim 9 wherein the force control module decreases the control force after the synchronizer slip reaches the predetermined threshold.

11. The DCT control module of claim 1 wherein the second shift state is a synchronizing shift state.

* * * * *